US012591431B2

(12) United States Patent
Kim

(10) Patent No.: US 12,591,431 B2
(45) Date of Patent: Mar. 31, 2026

(54) ARTIFICIAL INTELLIGENCE PROCESSING APPARATUS, AND DATA PREFETCHING DEVICE AND METHOD FOR ARTIFICIAL INTELLIGENCE PROCESSOR

(71) Applicant: ELECTRONICS AND TELECOMMUNICATIONS RESEARCH INSTITUTE, Daejeon (KR)

(72) Inventor: Hyun-Mi Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/539,012

(22) Filed: Dec. 13, 2023

(65) Prior Publication Data

US 2024/0201992 A1     Jun. 20, 2024

(30) Foreign Application Priority Data

Dec. 15, 2022     (KR) ........................ 10-2022-0176165
Jul. 5, 2023     (KR) ........................ 10-2023-0086849

(51) Int. Cl.
   *G06F 15/16*     (2006.01)
   *G06F 9/30*     (2018.01)
   *G06F 12/0862*     (2016.01)

(52) U.S. Cl.
   CPC ...... *G06F 9/30036* (2013.01); *G06F 12/0862* (2013.01)

(58) Field of Classification Search
   None
   See application file for complete search history.

(56) References Cited

U.S. PATENT DOCUMENTS 5,724,599 A * 3/1998 Balmer .................. G06F 15/16
                                                713/1
11,720,364 B2     8/2023 Alam et al.
         (Continued)

FOREIGN PATENT DOCUMENTS

KR     1020140132424 A     11/2014
KR     1020200047551 A     5/2020
         (Continued)

OTHER PUBLICATIONS

Dong, "Simple but Effective Heterogeneous Main Memory with On-Chip Memory Controller Support", Nov. 2010, IEEE (Year: 2010).*

*Primary Examiner* — Hyun Nam
(74) *Attorney, Agent, or Firm* — Rabin & Berdo, P.C.

(57)     ABSTRACT

Disclosed herein are a prefetching device and method for an artificial intelligence processor. The prefetching method includes prefetching data, stored in external off-chip memory, into internal on-chip memory in the artificial intelligence processor, and storing information including an address value and a total amount of matrix operation data in at least one control and status register, as a kernel program is executed, extracting a matrix operation instruction among instructions provided from an instruction cache of the off-chip memory, determining whether prefetching is enabled based on a result of extracting the matrix operation instruction, as prefetching is enabled, determining a number of blocks to be prefetched based on the information stored in the at least one control and status register, and determining a bus burst value corresponding to the determined number of blocks and transmitting the bus burst value as a data request signal through a bus interface.

19 Claims, 7 Drawing Sheets

(56) References Cited

U.S. PATENT DOCUMENTS

| | | | |
|---|---|---|---|
| 11,809,981 B1* | 11/2023 | Jain | G06N 3/0464 |
| 2002/0034971 A1* | 3/2002 | Chang | H04M 1/6075 |
| | | | 455/74.1 |
| 2011/0199391 A1* | 8/2011 | Olsson | G06T 1/60 |
| | | | 345/531 |
| 2013/0246708 A1* | 9/2013 | Ono | G06F 12/0862 |
| | | | 711/E12.024 |
| 2016/0055089 A1 | 2/2016 | Kim et al. | |
| 2019/0361811 A1 | 11/2019 | Saeki et al. | |
| 2021/0192328 A1 | 6/2021 | Ross | |
| 2021/0397557 A1 | 12/2021 | Lee et al. | |
| 2022/0067524 A1* | 3/2022 | Mathaikutty | G06N 5/04 |
| 2022/0100813 A1* | 3/2022 | Lagudu | G06F 17/16 |
| 2022/0171708 A1 | 6/2022 | Lee et al. | |
| 2022/0261622 A1 | 8/2022 | Norrie et al. | |
| 2022/0284658 A1* | 9/2022 | Müller | G06N 3/084 |
| 2022/0365695 A1* | 11/2022 | Zhang | G06F 3/0679 |
| 2022/0413866 A1* | 12/2022 | Nathella | G06F 9/3818 |
| 2023/0009375 A1* | 1/2023 | Lu | G06N 3/08 |
| 2023/0281270 A1* | 9/2023 | Ito | G06F 9/3887 |
| | | | 708/607 |
| 2024/0069914 A1* | 2/2024 | George | G06F 9/30043 |
| 2024/0143457 A1 | 5/2024 | Sity et al. | |

FOREIGN PATENT DOCUMENTS

| | | |
|---|---|---|
| KR | 1020210122043 A | 10/2021 |
| KR | 1020210123435 A | 10/2021 |
| KR | 1020210157624 A | 12/2021 |
| KR | 1020220074702 A | 6/2022 |
| KR | 1020220076325 A | 6/2022 |

* cited by examiner

START

SEPARATE PROGRAM BIN/KERNEL BIN       S310

ALLOCATE DYNAMIC MEMORY       S320

ALLOCATE MATRIX OPERATION DATA ADDRESS       S330

INSTRUCT MATRIX OPERATION DATA ADDRESS TO BE SET IN CSR       S340

ARTIFICIAL INTELLIGENCE PROCESSING APPARATUS, AND DATA PREFETCHING DEVICE AND METHOD FOR ARTIFICIAL INTELLIGENCE PROCESSOR

CROSS REFERENCE TO RELATED APPLICATIONS

This application claims the benefit of Korean Patent Application Nos. 10-2022-0176165, filed Dec. 15, 2022 and 10-2023-0086849, filed Jul. 5, 2023, which are hereby incorporated by reference in their entireties into this application.

BACKGROUND OF THE INVENTION

1. Technical Field

The following embodiments relate to prefetching technology of a memory device that is the essential component of high-performance Artificial Intelligence (AI) semiconductor.

2. Description of the Related Art

Among circuits constituting an artificial intelligence processor, a memory device for efficiently accessing data at speed as high as that of a high-performance calculator is essential.

To accommodate programs that are diversified depending on the development speed of artificial intelligence algorithms, a memory structure forming the artificial intelligence processor also adopts a hierarchical cache structure, primarily used in general-purpose processors or graphic processors, and uses the same as on-chip memory. In a cache structure-based memory device, a technique for increasing data reusability to achieve performance improvement and efficient lower-power consumption is one of core techniques.

Meanwhile, memory is divided into and used as off-chip memory which has a low processing speed, but is capable of storing a large amount of data, and on-chip memory which has a high processing speed, but has limitations on capacity due to factors such as a limited chip size and high manufacturing cost.

When an Artificial Intelligence (AI) algorithm is processed using a dedicated processor, the dedicated processor performs operations corresponding to the first step of moving data from off-chip memory to on-chip memory, the second step of storing again a result, calculated by the dedicated processor using the data of the on-chip memory, in the on-chip memory, and the third step of finally storing the data of the on-chip memory in the off-chip memory.

Among various technologies for improving the performance of an artificial intelligence processor, technology for accurately and efficiently designing a prefetcher enables overlapping of a data movement time between on-chip memory and off-chip memory with a computation time in a calculator, and improves data reusability in the on-chip memory, thus greatly contributing to the improvement of performance of the artificial intelligence processor.

However, a program for an artificial intelligence algorithm may be roughly divided into a normal operation and a matrix operation, and artificial intelligence semiconductor requires the processing of a large amount of data and then has been developed while adopting a structure for improving the processing speed of the matrix operation occupying a largest portion of computational processing time. Together with a high-performance calculator which improves the processing speed of the matrix operation, an efficient prefetcher for moving in advance pieces of data required for the matrix operation to on-chip memory closest to the high-performance calculator is essential.

SUMMARY OF THE INVENTION

An embodiment is intended to promptly prefetch data from off-chip memory into on-chip memory closer to a high-performance artificial intelligence processor.

An embodiment is intended to improve computational speed by enabling overlapping of a data movement time between on-chip memory and off-chip memory with a computation time in a calculator.

In accordance with an aspect, there is provided an artificial intelligence processing apparatus, including off-chip memory, a main central processing unit configured to execute an artificial intelligence program, and one or more artificial intelligence processors, wherein each of the one or more artificial intelligence processors includes a processing core, on-chip memory, and a prefetcher configured to load data stored in the off-chip memory into the on-chip memory.

The processing core may be implemented as a pair of a floating-point operation-based tensor processing unit configured to perform a matrix operation and a central processing unit configured to perform a normal operation.

The on-chip memory may include an instruction cache configured to store an instruction of the artificial intelligence program, and a data cache configured to store operation data of the artificial intelligence program.

The prefetcher may include at least one control and status register configured to store information including an address value and a total amount of matrix operation data.

The main central processing unit may execute a compiler configured to create machine code by optimizing the artificial intelligence program, and runtime software configured to execute the created machine code, wherein information extracted by the compiler and the runtime software is recorded in the at least one control and status register.

The main central processing unit may record the information extracted by the compiler and the runtime software in the control and status register through an Advanced Peripheral Bus (APB) interface.

The compiler may perform extracting a matrix operation represented by a nested loop in the artificial intelligence program, performing tiling to allocate the extracted matrix operation data to each of multiple processing cores, generating a matrix operation instruction based on a result of tiling, and creating machine code dedicated for the multiple processing cores from the matrix operation instruction.

The runtime software may perform separating a kernel program by decoding the artificial intelligence program, allocating a dynamic memory, allocating an address of the matrix operation data, and setting the address of the matrix operation data in the control and status register.

The prefetcher may perform as a kernel program is executed, extracting a matrix operation instruction among instructions provided from the instruction cache, determining whether prefetching is enabled based on a result of extracting the matrix operation instruction, as prefetching is enabled, determining a number of blocks to be prefetched, and determining a bus burst value corresponding to the determined number of blocks and transmitting the bus burst value as a data request signal through a bus interface.

The prefetcher may further perform receiving a Program Counter (PC) value of the central processing unit and adjusting the program counter value so that a difference between the address value of the artificial intelligence program, read from the instruction cache, and the program counter value is not increased to a certain threshold or more.

The prefetcher may be configured to, when determining whether prefetching is enabled, determine that prefetching is enabled only when a first matrix operation instruction is extracted.

The prefetcher may be configured to, when determining the number of blocks, determine the number of blocks based on the address value and the total amount of data of the matrix operation data, stored in the control and status register.

The prefetcher may be configured to, when determining the bus burst value, determine the bus burst value based on a size of one block of the data cache and a data bandwidth of a bus interface.

In accordance with another aspect, there is provided a prefetching device for an artificial intelligence processor, including at least one control and status register configured to prefetch data, stored in an external off-chip memory, into an internal on-chip memory in an artificial intelligence processor, and to store information including an address value and a total amount of matrix operation data, a matrix operation discrimination unit configured to, as a kernel program is executed, extract a matrix operation instruction among instructions provided from an instruction cache of the off-chip memory, a prefetching/non-prefetching determination unit configured to determine whether prefetching is enabled based on a result of extracting the matrix operation instruction, a prefetch block number determination unit configured to, as prefetching is enabled, determine a number of blocks to be prefetched based on the information stored in the at least one control and status register, and a request signal generation unit configured to determine a bus burst value corresponding to the determined number of blocks and transmit the bus burst value as a data request signal through a bus interface.

The matrix operation discrimination unit may be configured to receive a Program Counter (PC) value of a central processing unit of the artificial intelligence processor and adjust the program counter value so that a difference between the address value of the artificial intelligence program, read from the instruction cache, and the program counter value is not increased to a certain distance or more.

The prefetching/non-prefetching determination unit may determine that prefetching is enabled only when a first matrix operation instruction is extracted.

The prefetch block number determination unit may determine the number of blocks to be prefetched based on the address value and the total amount of matrix operation data stored in the control and status register.

The request signal generation unit may determine the bus burst value based on a size of one block of a data cache in the off-chip memory and a data bandwidth of a bus interface.

In accordance with a further aspect, there is provided a prefetching method for an artificial intelligence processor, including prefetching data, stored in an external off-chip memory, into an internal on-chip memory in the artificial intelligence processor, and storing information including an address value and a total amount of matrix operation data in at least one control and status register, as a kernel program is executed, extracting a matrix operation instruction among instructions provided from an instruction cache of the off-chip memory, determining whether prefetching is enabled based on a result of extracting the matrix operation instruction, as prefetching is enabled, determining a number of blocks to be prefetched based on the information stored in the at least one control and status register, and determining a bus burst value corresponding to the determined number of blocks and transmitting the bus burst value as a data request signal through a bus interface.

Determining the number of block to be prefetched may include determining the number of blocks to be prefetched based on the address value and the total amount of the matrix operation data stored in the control and status register, and transmitting as the data request signal may include determining the bus burst value based on a size of one block of a data cache of the off-chip memory and a data bandwidth of the bus interface.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
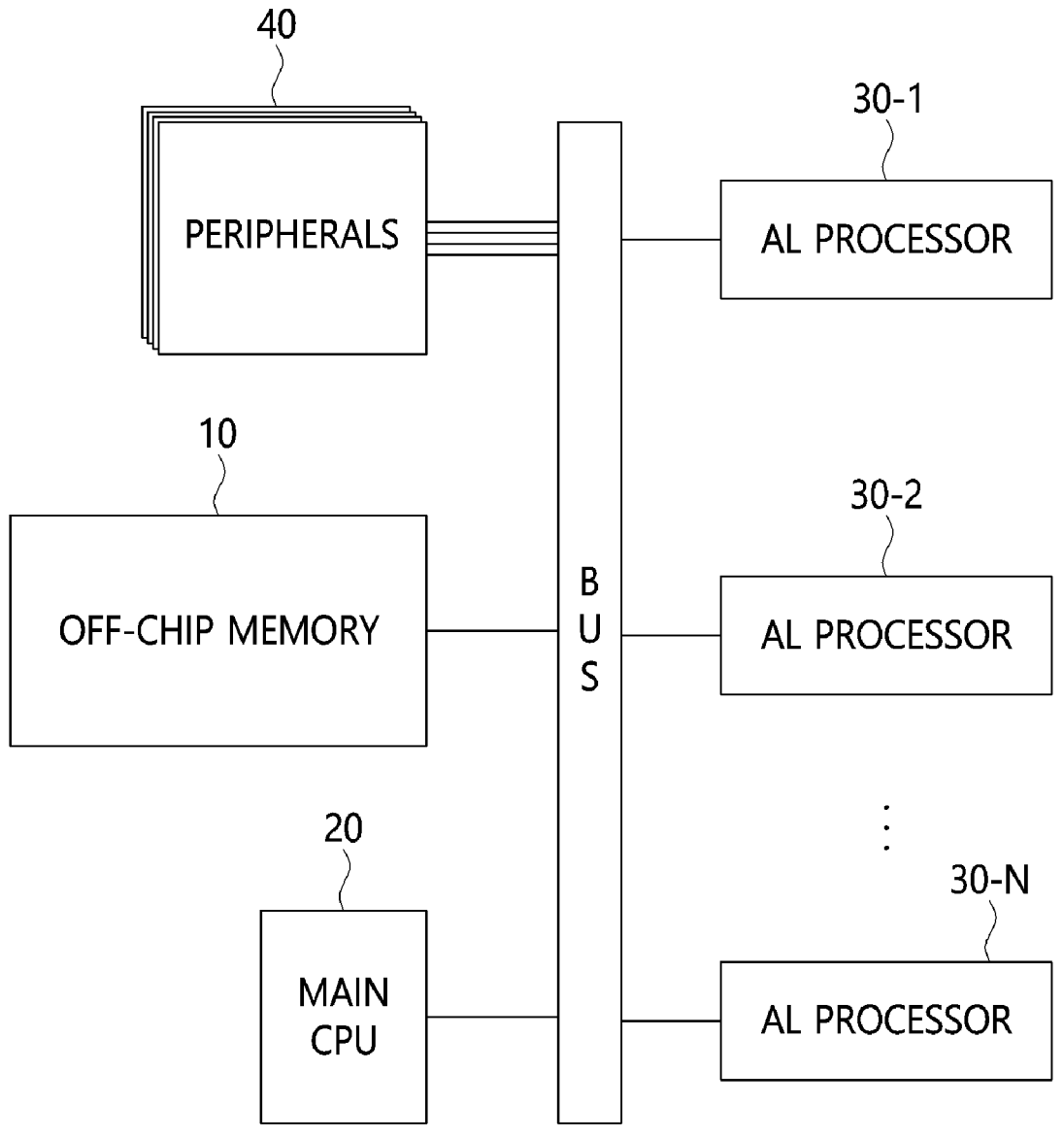
FIG. 1 is a schematic block configuration diagram of an artificial intelligence processing apparatus according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Figure 2:
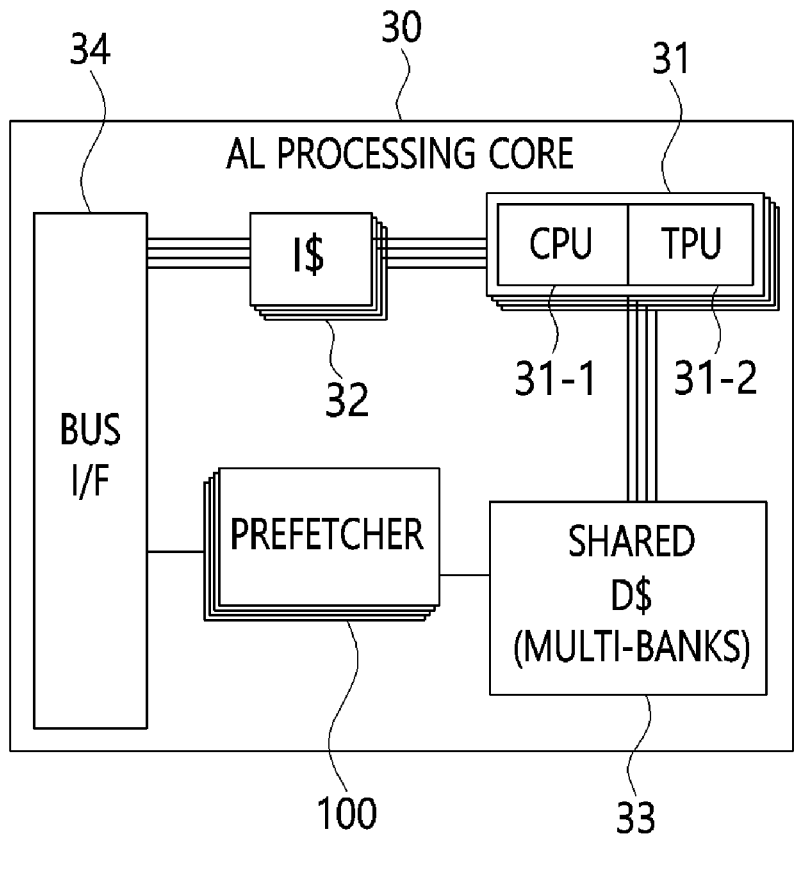
FIG. 2 is a block diagram illustrating the internal configuration of an artificial intelligence processor.

FIG. 1 is a schematic block configuration diagram of an artificial intelligence processing apparatus according to an embodiment, and FIG. 2 is a block diagram illustrating the internal configuration of an artificial intelligence processor.

Referring to FIG. 1, the artificial intelligence processing apparatus according to the embodiment has a structure in which off-chip memory 10, a main central processing unit (CPU) 20, one or more artificial intelligence processors (AI processors) 30-1, 30-2, . . . , 30-N, and peripherals 40 interface with each other through a bus.

The off-chip memory 10 is memory that is capable of storing a large amount of data. For example, the off-chip memory 10 may be Double Date Rate (DDR) memory, High Bandwidth Memory (HBM) or the like.

The main CPU 20 may execute an artificial intelligence (AI) program. Here, the artificial intelligence program may roughly include a normal operation and a matrix operation. Here, to improve the processing speed of the artificial intelligence program, the matrix operation may be allocated to the one or more artificial intelligence processors 30-1, 30-2, . . . , 30-N, and may be processed in parallel.

The one or more artificial intelligence processors 30-1, 30-2, . . . , 30-N may be parallel operation processing-based multi-AI dedicated processing cores, respectively, and may include hierarchical on-chip memory implemented together with the peripherals through the bus.

Referring to FIG. 2, each of the one or more artificial intelligence processors 30-1, 30-2, . . . , 30-N may include processing cores 31, on-chip memories 32 and 33, a prefetcher 100, and a bus interface (I/F) 34.

Each processing core 31 may be implemented as a pair of a floating-point operation-based Tensor Processing Unit (TPU) 31-1 for performing a matrix operation and a Central Processing Unit (CPU) 31-2 for performing a normal operation.

The on-chip memories 32 and 33 may include an instruction cache (I$) 32 which stores the instructions of the AI program, and a data cache (D$) 33 which stores the operation data of the AI program. Therefore, the processing core 31 may be provided with instructions from the instruction cache 32, and may be provided with the operation data from the data cache 33.

Meanwhile, when there are multiple pairs of the Tensor Processing Unit (TPU) 31-1 and the Central Processing Unit (CPU) 31-2, the data cache 33 may be designed as a shared cache to be profitable for data sharing. Here, in order to reduce a bottleneck phenomenon, the memory (data cache) may be divided into multi-banks, and may then be implemented as a non-blocking cache.

The prefetcher 100 may preload and store data from the off-chip memory 10 into the on-chip memories 32 and 33 closer to the processing core 31 through the bus interface (Bus I/F) 34.

Figure 3:
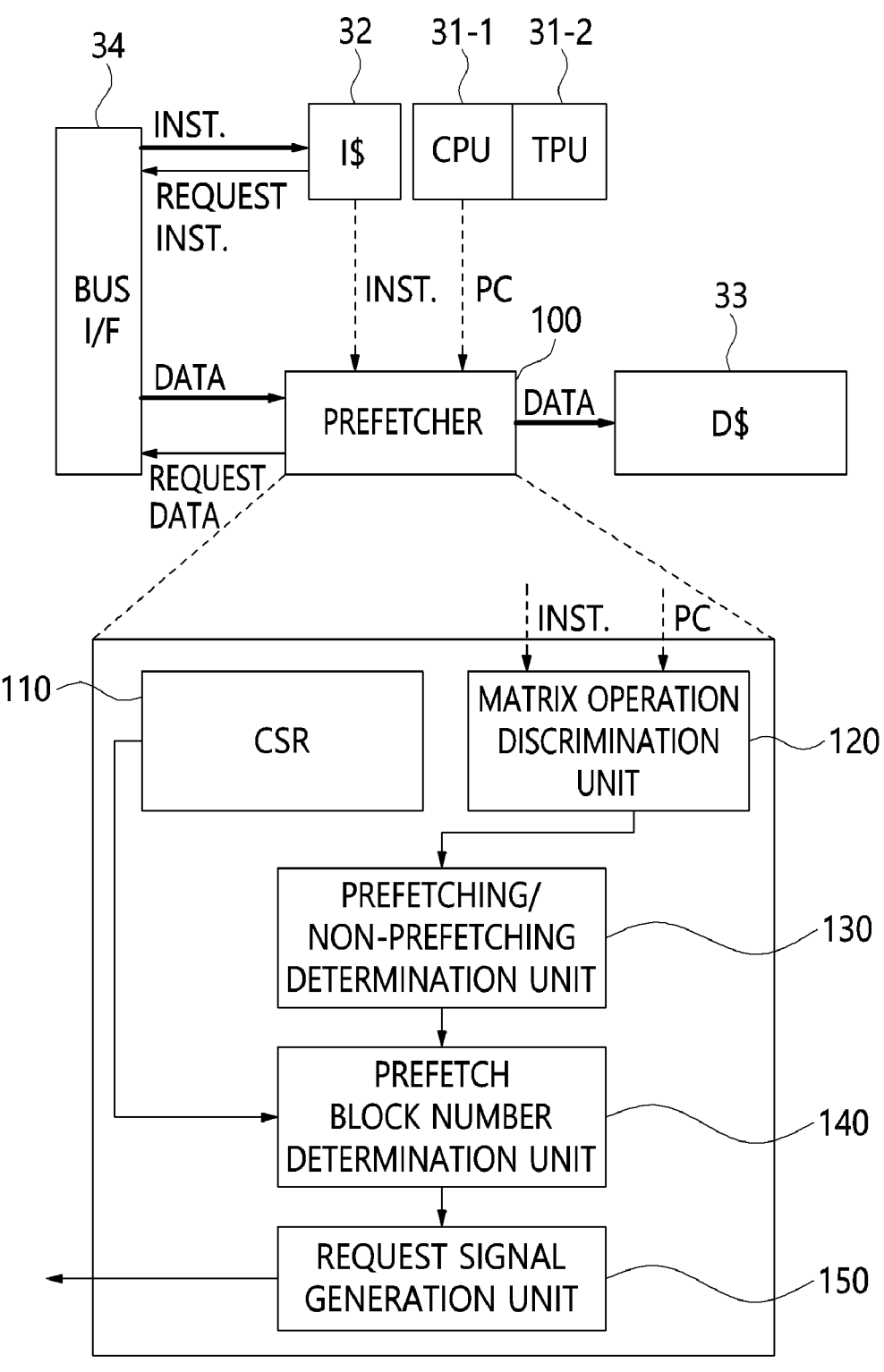
FIG. 3 is a schematic block diagram illustrating the internal configuration of a prefetcher according to an embodiment.

FIG. 3 is a schematic block diagram illustrating the internal configuration of a prefetcher according to an embodiment.

Referring to FIG. 3, the prefetcher 100 according to the embodiment may include at least one Control and Status Register (CSR) 110, a matrix operation discrimination unit 120, a prefetching/non-prefetching determination unit 130, a prefetch block number (count) determination unit 140, and a request signal generation unit 150.

The at least one Control and Status Register (CSR) 110 stores parameters required for each processing core 31, and stores information including the address value of input data required for a matrix operation and the total amount of data allocated to multiple processing cores 31. In this way, pieces of information stored in the at least one control and status register 110 may be used to determine whether prefetching is performed and determine the number of blocks to be prefetched.

The pieces of information stored in the at least one control and status register 110 may be extracted by a compiler and runtime software that are executed by the main CPU 20. That is, before a kernel program is executed, the main CPU 20 may set the parameters required for the processing core 31 in the control and status register 110 by decoding the artificial intelligence program.

Detailed description thereof will be made later with reference to FIGS. 4 and 5.

Here, the main CPU 20 may record the information extracted by the compiler and the runtime software in the control and status register 110 through an Advanced Peripheral Bus (APB) interface.

The matrix operation discrimination unit 120 extracts a matrix operation-related instruction among the instructions provided from the instruction cache 32.

The prefetching/non-prefetching determination unit 130 determines whether prefetching is performed, based on the result of extracting the matrix operation-related instruction by the matrix operation discrimination unit 120. That is, when the matrix operation-related instruction is extracted, prefetching may be enabled.

The prefetch block number determination unit 140 determines the amount of data to be prefetched as prefetching is enabled. Here, the number of blocks to be prefetched is determined based on the address value and the amount of the matrix operation data recorded in the control and status register 110.

The request signal generation unit 150 generates a burst value based on the size of one block of the data cache 33 and the data bandwidth of the bus interface 34 and transmits the burst value as a data request signal through the bus interface 34. That is, in response to the data request signal, the data stored in the off-chip memory 10 may be prefetched into the on-chip memories 32 and 33.

Figure 4:
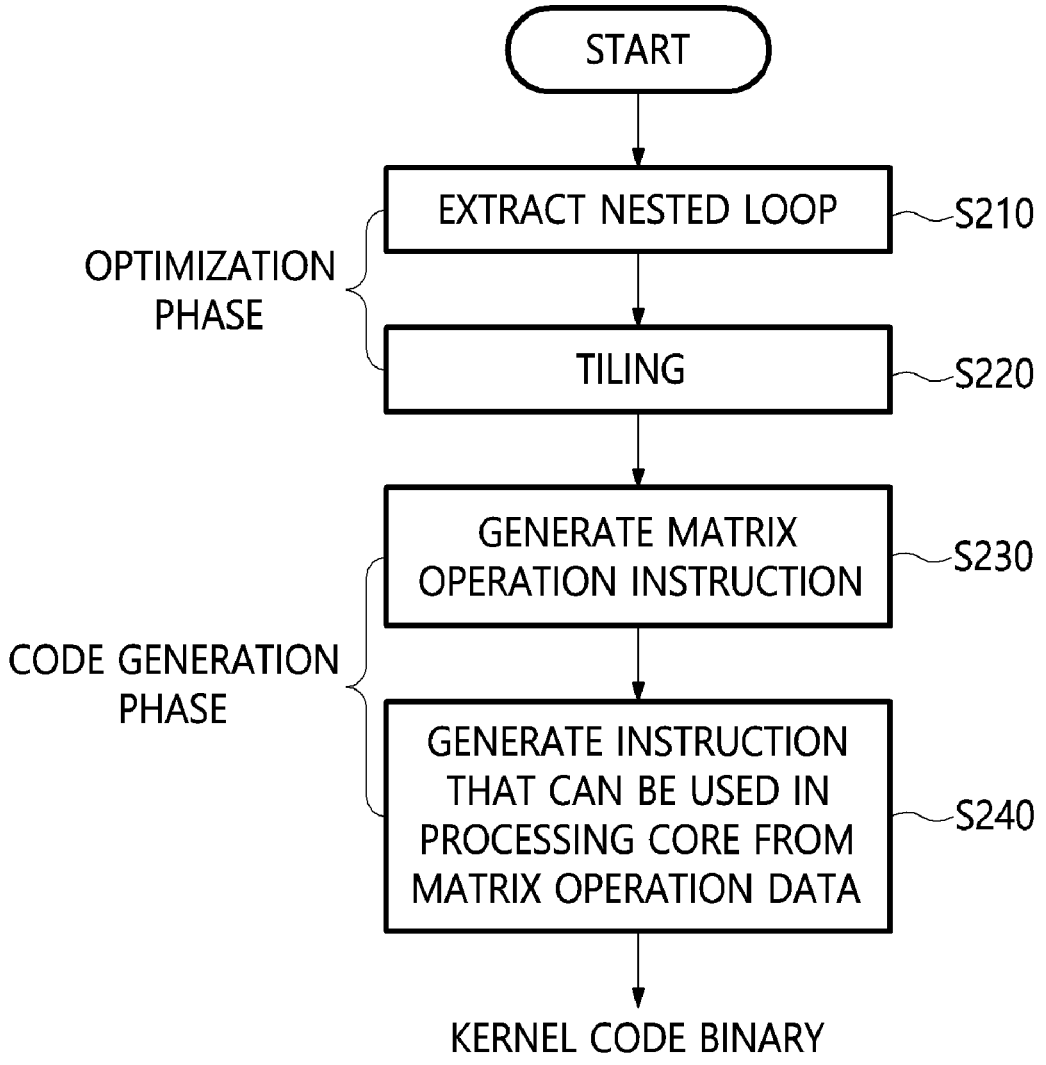
FIG. 4 is a flowchart for explaining the operation of a compiler according to an embodiment.

FIG. 4 is a flowchart for explaining the operation of a compiler according to an embodiment.

Referring to FIG. 4, the compiler may optimize an AI program at steps S210 and S220, and thereafter create machine code from the optimized AI program at steps S230 and S240.

That is, the compiler may extract a matrix operation represented by a nested loop from the AI program at step S210. Thereafter, tiling of allocating extracted matrix operation data to respective multiple cores is performed at step S220. That is, an area in which matrix operation data used to perform the matrix operation is stored, and the amount of the data used to perform the matrix operation may be determined.

Next, the compiler generates a matrix operation instruction based on the result of tiling at step S230, and generates a dedicated instruction that can be used in the processing core 31 from the matrix operation data at step S240.

Figure 5:
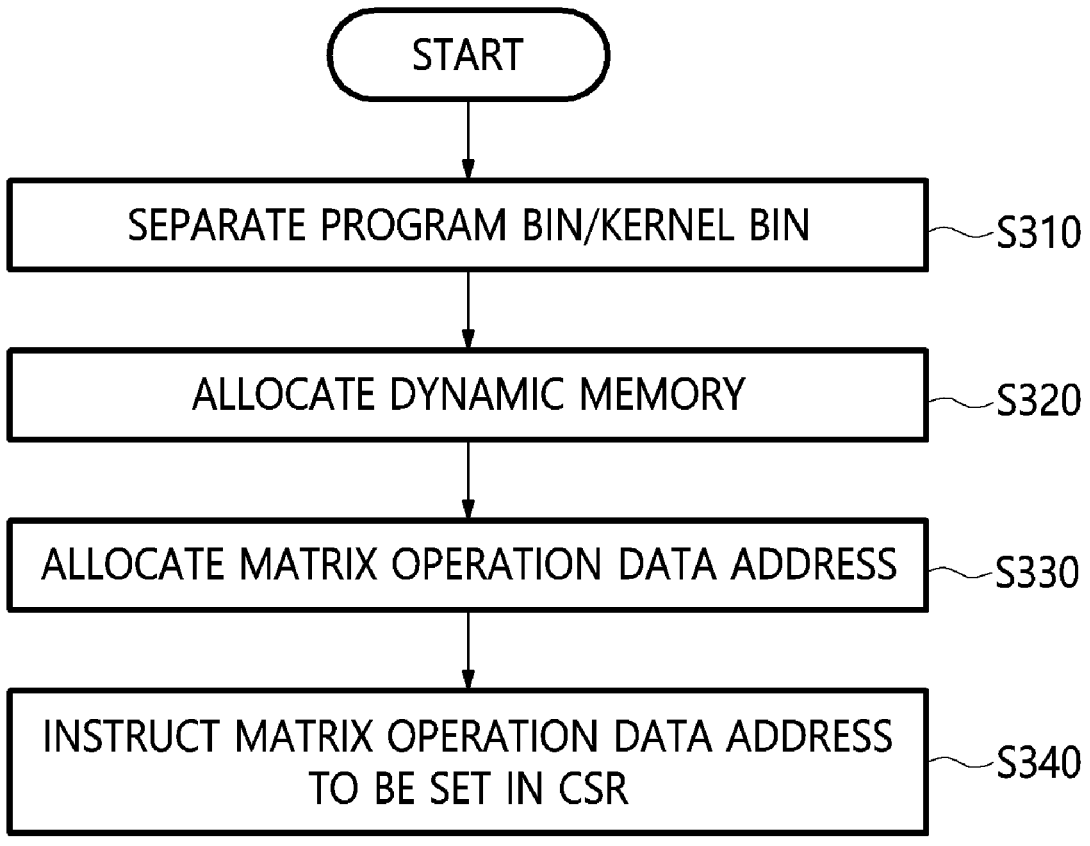
FIG. 5 is a flowchart for explaining the operation of runtime software according to an embodiment.

FIG. 5 is a flowchart for explaining the operation of runtime software according to an embodiment.

Referring to FIG. 5, the runtime software separates a kernel program by decoding an artificial intelligence (AI) program at step S310, and then allocates dynamic memory to the kernel program at step S320.

Further, the runtime software allocates the address of matrix operation data at step S330, and instructs the matrix operation data address to be set in the control and status register 110 at step S340.

Figure 6:
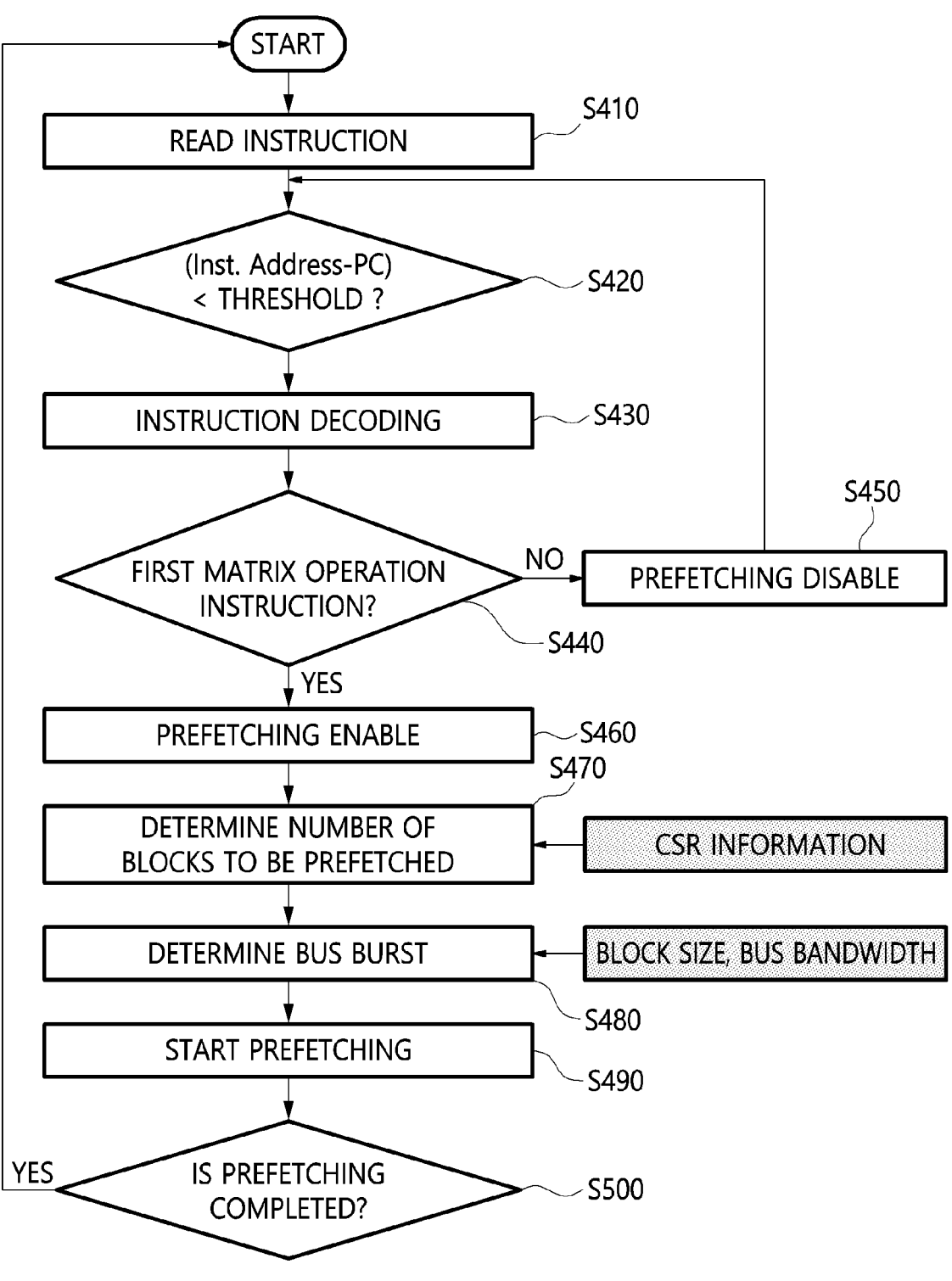
FIG. 6 is a flowchart for explaining the operation of a prefetcher according to an embodiment.

FIG. 6 is a flowchart for explaining a data prefetching method for an artificial intelligence processor according to an embodiment.

Referring to FIG. 6, the prefetcher 100 reads an instruction from the instruction cache as a kernel program is executed at step S410.

Here, the prefetcher 100 receives the value of the Program Counter (PC) of the CPU 31-1, together with the instruction, to check whether a difference between the address value Inst.Address of a program read from the instruction cache 32 and the PC value of the CPU 31-1 is equal to or greater than a preset threshold at step S420, and adjusts the difference not to exceed the preset threshold at step S425.

Thereafter, the prefetcher 100 decodes the instruction read from the instruction cache at step S430, and determines whether the instruction is a matrix operation instruction at step S440.

Here, whether the instruction is a first matrix operation instruction is determined. The reason for this is that, when the first matrix operation instruction is extracted, the total amount of data allocated to the multiple processing cores 31 is prefetched from the off-chip memory 10 corresponding to the address value of input data for a matrix operation based on the parameters stored in the control and status register 110. That is, because data required to execute a second matrix operation instruction is already prefetched, there is no need to perform again prefetching.

When it is determined at step S440 that the instruction is neither a matrix operation instruction nor the first matrix operation instruction, the prefetcher 100 determines that prefetching is disabled at step S450, and returns to step S410.

On the other hand, when it is determined at step S440 that the instruction is the first matrix operation instruction, the prefetcher 100 determines that prefetching is enabled at step S460.

Then, the prefetcher 100 determines the number of blocks to be prefetched with reference to the address value and the amount of the matrix operation data stored in the control and status register 110 at step S470.

Thereafter, the prefetcher 100 determines a burst value based on the size of one block of the data cache 33 and the bus bandwidth of the bus interface 34 at step S480, and starts prefetching by transmitting a data request signal (Data Request) through the bus interface 34 at step S490. When this prefetching is completed at step S500, the process returns to step S410.

Figure 7:
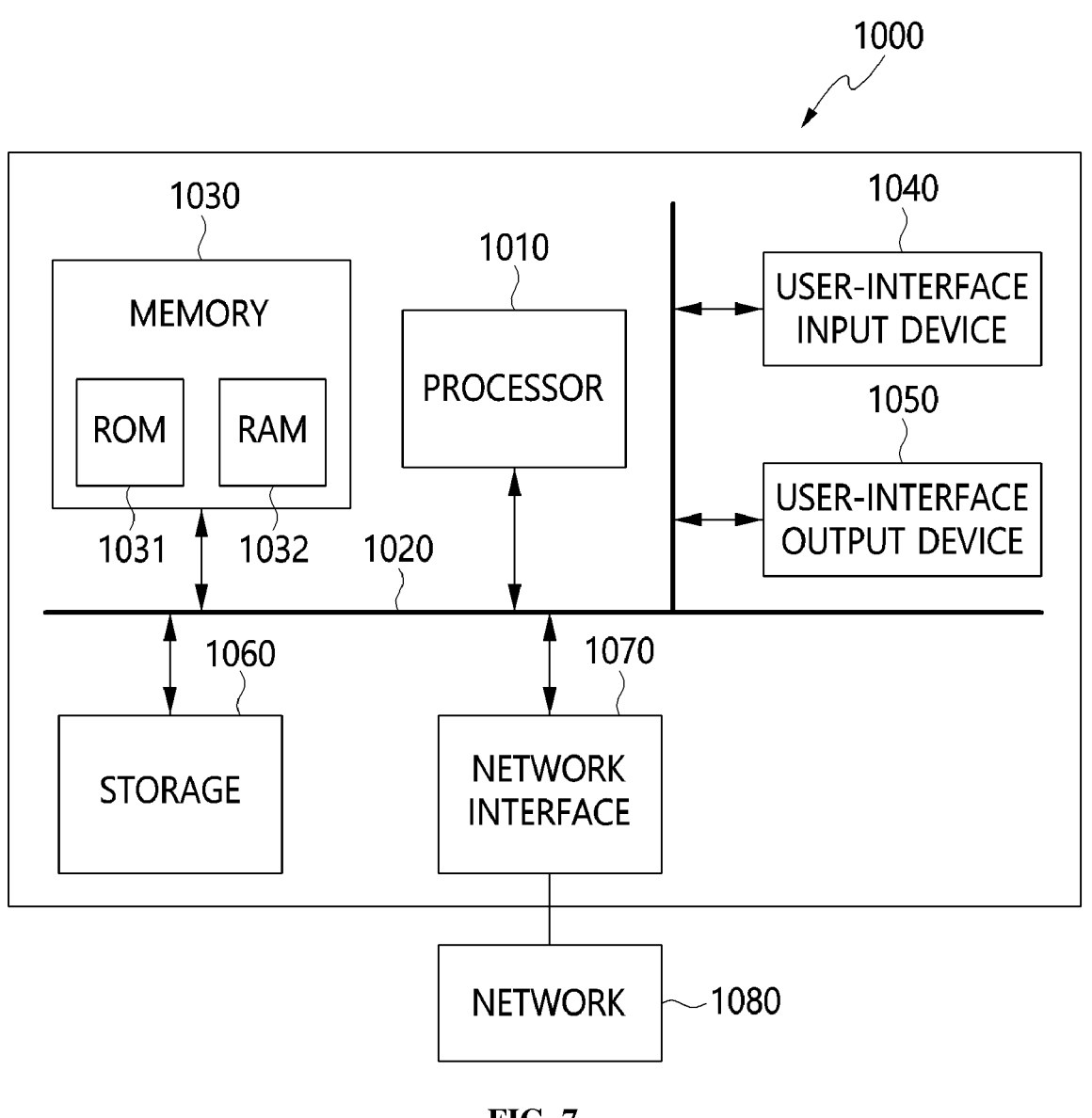
FIG. 7 is a diagram illustrating the configuration of a computer system according to an embodiment.

FIG. 7 is a diagram illustrating the configuration of a computer system according to an embodiment.

An apparatus according to an embodiment may be implemented in a computer system 1000 such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semi-conductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium or an information delivery medium, or a combination thereof. For example, the memory 1030 may include Read-Only Memory (ROM) 1031 or Random Access Memory (RAM) 1032.

The embodiments may promptly prefetch data from off-chip memory into on-chip memory closer to a high-performance artificial intelligence processor.

The embodiments may improve computational speed by enabling overlapping of a data movement time between on-chip memory and off-chip memory with a computation time in a calculator.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. An artificial intelligence processing apparatus, comprising:

an off-chip memory;

a main central processing unit configured to execute an artificial intelligence program; and one or more artificial intelligence processors, wherein each of the one or more artificial intelligence processors comprises:

a processing core;

an on-chip memory; and a prefetcher configured to load data stored in the off-chip memory into the on-chip memory;

wherein the processing core is implemented as a pair of a floating-point operation-based tensor processing unit configured to perform a matrix operation and a central processing unit configured to perform a normal operation.

2. The artificial intelligence processing apparatus of claim 1, wherein the on-chip memory comprises:

an instruction cache configured to store an instruction of the artificial intelligence program; and a data cache configured to store operation data of the artificial intelligence program.

3. The artificial intelligence processing apparatus of claim 2, wherein the prefetcher comprises at least one control and status register configured to store information including an address value and a total amount of matrix operation data.

4. The artificial intelligence processing apparatus of claim 3, wherein the main central processing unit executes:

a compiler configured to create machine code by optimizing the artificial intelligence program; and runtime software configured to execute the created machine code, wherein information extracted by the compiler and the runtime software is recorded in the at least one control and status register.

5. The artificial intelligence processing apparatus of claim 4, wherein the main central processing unit records the information extracted by the compiler and the runtime software in the control and status register through an Advanced Peripheral Bus (APB) interface.

6. The artificial intelligence processing apparatus of claim 4, wherein the compiler performs:

extracting a matrix operation represented by a nested loop in the artificial intelligence program;

performing tiling to allocate the extracted matrix operation data to each of multiple processing cores;

generating a matrix operation instruction based on a result of tiling; and creating machine code dedicated for the multiple processing cores from the matrix operation instruction.

7. The artificial intelligence processing apparatus of claim 4, wherein the runtime software performs:

separating a kernel program by decoding the artificial intelligence program;

allocating a dynamic memory;

allocating an address of the matrix operation data; and setting the address of the matrix operation data in the control and status register.

8. The artificial intelligence processing apparatus of claim 3, wherein the prefetcher performs:

as a kernel program is executed, extracting a matrix operation instruction among instructions provided from the instruction cache;

determining whether prefetching is enabled based on a result of extracting the matrix operation instruction;

as prefetching is enabled, determining a number of blocks to be prefetched; and determining a bus burst value corresponding to the determined number of blocks and transmitting the bus burst value as a data request signal through a bus interface.

9. The artificial intelligence processing apparatus of claim 8, wherein the prefetcher further performs:

receiving a Program Counter (PC) value of the central processing unit and adjusting the program counter value so that a difference between an address value of the artificial intelligence program, read from the instruction cache, and the program counter value is not increased to a certain distance or more.

10. The artificial intelligence processing apparatus of claim 8, wherein the prefetcher is configured to, when determining whether prefetching is enabled, determine that prefetching is enabled only when a first matrix operation instruction is extracted.

11. The artificial intelligence processing apparatus of claim 8, wherein the prefetcher is configured to, when determining the number of blocks, determine the number of blocks based on the address value and the total amount of data of the matrix operation data, stored in the control and status register.

12. The artificial intelligence processing apparatus of claim 8, wherein the prefetcher is configured to, when determining the bus burst value, determine the bus burst value based on a size of one block of the data cache and a data bandwidth of a bus interface.

13. A prefetching device for an artificial intelligence processor, comprising:

at least one control and status register configured to prefetch data, stored in an external off-chip memory, into an internal on-chip memory in an artificial intelligence processor, and to store information including an address value and a total amount of matrix operation data;

a matrix operation discrimination unit configured to, as a kernel program is executed, extract a matrix operation instruction among instructions provided from an instruction cache of the off-chip memory;

a prefetching/non-prefetching determination unit configured to determine whether prefetching is enabled based on a result of extracting the matrix operation instruction;

a prefetch block number determination unit configured to, as prefetching is enabled, determine a number of blocks to be prefetched based on the information stored in the at least one control and status register; and a request signal generation unit configured to determine a bus burst value corresponding to the determined number of blocks and transmit the bus burst value as a data request signal through a bus interface.

14. The prefetching device of claim 13, wherein the matrix operation discrimination unit is configured to receive a Program Counter (PC) value of a central processing unit of the artificial intelligence processor and adjust the program counter value so that a difference between an address value of the artificial intelligence program, read from the instruction cache, and the program counter value is not increased to a certain distance or more.

15. The prefetching device of claim 13, wherein the prefetching/non-prefetching determination unit determines that prefetching is enabled only when a first matrix operation instruction is extracted.

16. The prefetching device of claim 13, wherein the prefetch block number determination unit determines the number of blocks to be prefetched based on the address value and the total amount of matrix operation data stored in the control and status register.

17. The prefetching device of claim 13, wherein the request signal generation unit determines the bus burst value based on a size of one block of a data cache in the off-chip memory and a data bandwidth of a bus interface.

18. A prefetching method for an artificial intelligence processor, comprising:

prefetching data, stored in an external off-chip memory, into an internal on-chip memory in the artificial intelligence processor, and storing information including an address value and a total amount of matrix operation data in at least one control and status register;

as a kernel program is executed, extracting a matrix operation instruction among instructions provided from an instruction cache of the off-chip memory;

determining whether prefetching is enabled based on a result of extracting the matrix operation instruction;

as prefetching is enabled, determining a number of blocks to be prefetched based on the information stored in the at least one control and status register; and determining a bus burst value corresponding to the determined number of blocks and transmitting the bus burst value as a data request signal through a bus interface.

19. The prefetching method of claim 18, wherein:

determining the number of blocks to be prefetched comprises determining the number of blocks to be prefetched based on the address value and the total amount of the matrix operation data stored in the control and status register, and transmitting as the data request signal comprises determining the bus burst value based on a size of one block of a data cache of the off-chip memory and a data bandwidth of the bus interface.

* * * * *